United States Patent [19]

Staats

[11] 3,974,592

[45] Aug. 17, 1976

[54] FORKED STAKES FOR ANIMAL TRAPS

[76] Inventor: Stanley E. Staats, R.R. 2, Wapello, Iowa 52653

[22] Filed: July 23, 1975

[21] Appl. No.: 598,197

[52] U.S. Cl. .................................. 43/88; 43/96; 248/302
[51] Int. Cl.² .................................. A01M 23/26
[58] Field of Search .................. 43/81–97, 43/58; 248/354 L, 175, 153, 156, 302

[56] References Cited
UNITED STATES PATENTS

| 936,808 | 10/1904 | Pozsonyl | 43/86 |
| 2,078,866 | 4/1937 | Metz | 248/302 |
| 3,010,245 | 11/1961 | Conibear | 43/97 |
| 3,060,623 | 10/1962 | Aldrich | 43/87 |
| 3,276,159 | 10/1966 | Robards | 43/87 |
| 3,747,259 | 7/1973 | Pellowski | 43/96 |

Primary Examiner—Louis G. Mancene
Assistant Examiner—Peter K. Skiff
Attorney, Agent, or Firm—Glenn H. Antrim

[57] ABSTRACT

A rotating frame animal trap is held between a pair of spaced prongs. Each prong has a pair of pegs protruding inwardly to straddle a respective pivot of the trap. The prongs are held together by a ring that slides into position by gravity after a trap is positioned between the prongs. The prongs are inserted in the ground to hold the trap at a desired height.

3 Claims, 2 Drawing Figures

FORKED STAKES FOR ANIMAL TRAPS

BACKGROUND OF THE INVENTION

This invention relates to animal traps and particularly to stakes for setting rotating-frame animal traps in trails.

Commonly, when a trap is set, it is connected by a chain to a stake that is driven in the ground. Traps that have coil springs can be staked by inserting the stake through the coils or the loop of the spring. To catch animals such as beavers and muskrats that habitate the banks of streams, other staking means must be used to set traps above the edge of the streams in the trails to the animal's dens.

Favorite traps for catching animals are rotating-frame traps having two opposite pivots about which the frames rotate to function as jaws for catching animals. These traps have, at either one or both of their pivots, rings about their frames and coil springs for urging the rings apart. Typical traps of this type are the Conibear traps shown in U.S. Pat. No. 3,010,245 issued to F. E. Conibear on Nov. 28, 1961. To set the Conibear traps in trails over the edges of streams by use of usual stakes, trappers may have to wade into streams, and may have to improvise means for holding the traps on one or two stakes at desired heights.

SUMMARY OF THE INVENTION

The forked stake according to the present invention is shaped somewhat like a tuning fork except the prongs and the handle are slender. The prongs are somewhat farther apart than the distance between the two opposite pivots of a rotating-frame animal trap with which the stake is to be used. A U-shaped frame providing a pair of pegs on each of the prongs is adapted to straddle a pivot of a rotating-frame trap. After the trap is set, the stake is positioned across the trap with the pegs straddling the pivots to hold the trap firmly between the prongs of the stake.

In a preferred embodiment, a single piece of rod having spring characteristics is folded at the center to form a loop; extending from the loop, two adjacent portions form a stem or shank of a handle; and the ends of the stem opposite the loop is bifurcated and turned outwardly and then downwardly away from the handle to form the prongs. A ring is placed about the two adjacent portions of the handle, and when the ring is positioned close to the prongs, the prongs are spaced apart the required distance for holding a rotating-frame animal trap. As the ring is moved toward the loop of the handle, the prongs are spread by the spring tension of the rod.

After a trap has its spring set, the stake is positioned about the pivots of the trap. The stake can then be pressed into the ground the amount that is required to position the trap firmly before the entrance of an animal's den. The trapper can press downwardly with his boot or shoe on the part of the stake that joins the prongs and the handle to set the trap at the edge of the stream without having to enter the water. The trap is held off the bottom of the stream, and is not likely to be filled with debris.

DESCRIPTION OF THE PREFERRED EMBODIMENT

Figure 2:
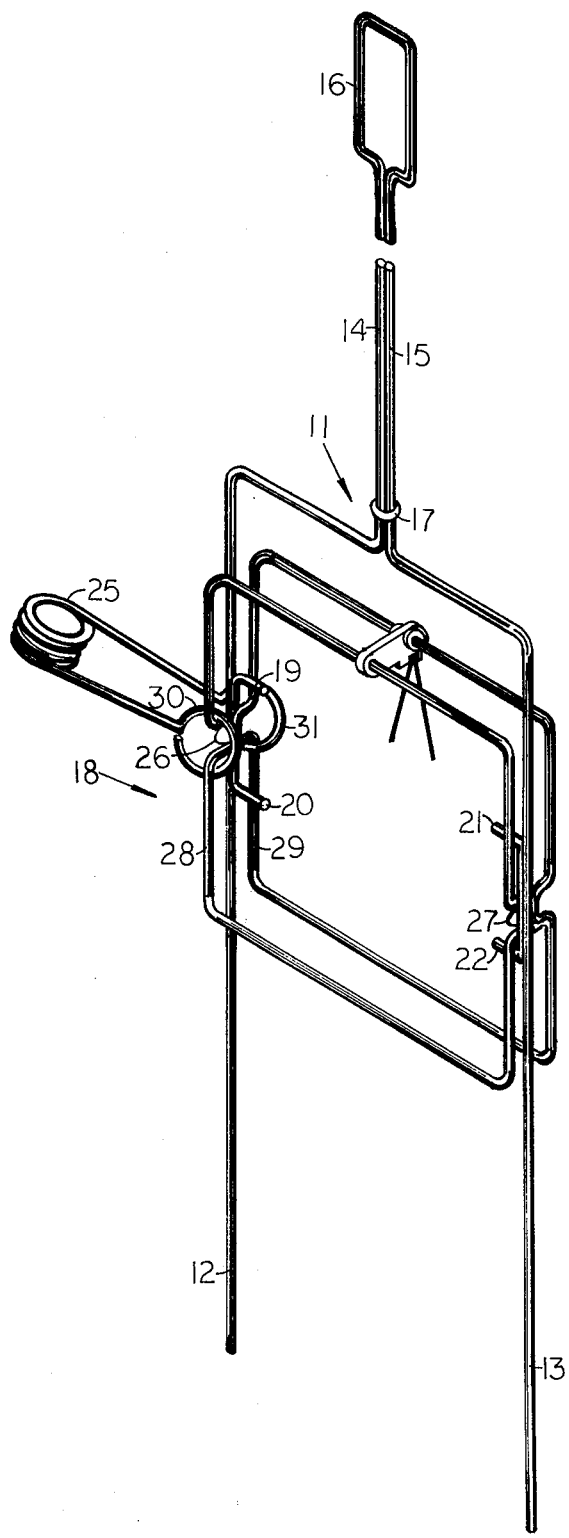
FIG. 2 is a perspective view of the stake holding a rotating-frame trap.
Figure 1:
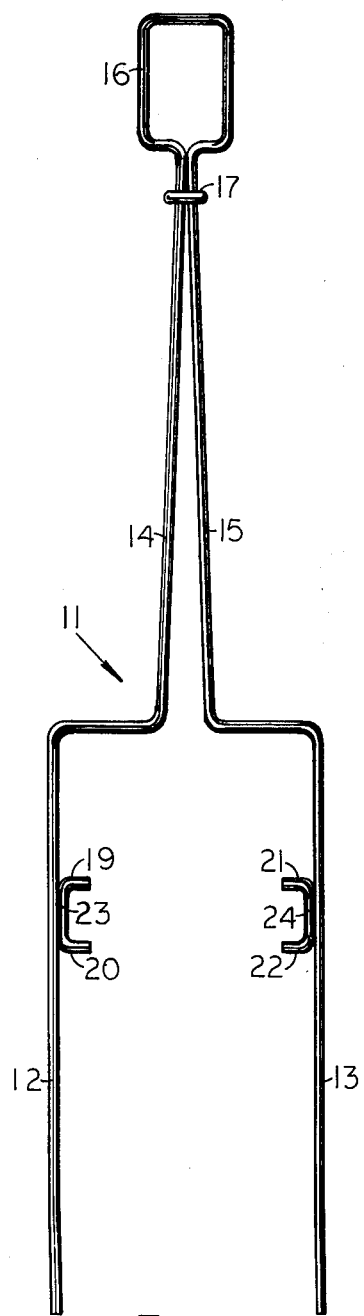
FIG. 1 is a front view of the forked stake of this invention.

A forked stake 11 of FIG. 1 has prongs 12 and 13 spaced apart a little more than the distance between the pivots of a trap to which it is to be applied. The prongs 12 and 13 are nearly parallel, and are practically parallel when the fork 11 is in position for use as shown in FIG. 2. The upper ends of the prongs 12 and 13 are curved inwardly at a right angle for about one-half the distance between the prongs and then curved upwardly to form straight, adjacent portions 14 and 15 respectively that appear as a split handle extending upwardly from the prongs. The upper end of the handle terminates in a loop 16 that extends between the straight portions 14 and 15.

The prongs and the handle of the forked stake 11 are preferably formed from a single length of steel rod having spring characteristics. Although ¼-inch rod may be used, 3/16-inch rod is believed to be preferable. Obviously, the center of the length of rod from which the fork 11 is fabricated corresponds to the loop 16 at the upper end of the handle, and the lower portions of the prongs 12 and 13 that are to be inserted in the ground are the ends of the length of rod. The upper portion of the handle has sufficient spring tension to urge the straight portions 14 and 15 to diverge outwardly as they approach the prongs 12 and 13 as shown in FIG. 1.

A short piece of ¼-inch rod is formed into a retaining ring 17. The ring 17 is positioned about the straight portions 14 and 15 of the forked stake, and then its ends are welded together such that the ring 17 is a sliding fit along the straight portions 14 and 15. As shown in FIG. 1, when the ring 17 is near the loop 16, the tension of the rod from which the forked stake 11 is formed causes the straight portions 14 and 15 to diverge somewhat for increasing the distance between the prongs 12 and 13. In FIG. 2, the ring 17 has been allowed to slide to a position near the opposite ends of the straight portions 14 and 15 for holding the straight portions together and thereby to hold the prongs 12 and 13 parallel in an inwardly position.

In order to hold a rotating-frame animal trap 18 securely between the prongs 12 and 13, two pairs of pegs are provided to fit about the pivots of the trap. A pair of pegs 19 and 20 at right angles to the prong 12 protrude therefrom in a direction toward the opposite prong 13; and similarly, a pair of pegs 21 and 22 protrude from corresponding points on the prong 13. Conveniently, the pegs 19 and 20 may be the ends of a U-shaped piece 23 of ¼-inch rod, and likewise the pegs 21 and 22 may be portions of the U-shaped piece 24. The bases of the U-shaped pieces 23 and 24 are welded to corresponding points on the upper portions of the prongs 12 and 13 respectively. The pegs 19–20 or 21–22 of each pair are spaced apart far enough to straddle easily the pivots of an animal trap that is to be positioned between the prongs 12 and 13. The length of the pegs 19–22 is sufficient to permit the pegs to extend through the spaces between the frames or jaws near the pivot points of the trap.

In FIG. 2, a Conibear rotating-frame animal trap 18 suitable for catching muskrat or beaver is shown with its spring 25 in a set position. After the spring 25 of the trap is set, a trapper holds the trap by its spring and positions the prongs 12 and 13 of the forked stake 11 along respective pivots 26 and 27 respectively of the trap. Before positioning the prongs 12 and 13 along the ends of the trap 18, the retaining ring 17 is positioned upwardly near the loop 16 to spread the prongs for permitting the ends of the pegs 20 and 22 to slide over the outer ends of the pivots 26 and 27 respectively. The end of the prong 12 is first inserted between the ends of the spring 25, and likewise if a trap has a spring used in conjunction with the pivot 27 the prong 13 is inserted between the ends of that spring. Then the prongs are moved along the pivots until the pegs 19 and 20 straddle the pivot 26, and the opposite pegs 21 and 22 straddle the opposite pivot 27. The straight portions 14 and 15 of the handle are squeezed together by hand to permit the ring 17 to fall by gravity to a lower position about the straight portions 14 and 15. The distance between the prongs 12 and 13 has then been decreased sufficiently to hold the pair of pegs 19 and 20 and the pair of pegs 21 and 22 inwardly between the frames 28 and 29 of the trap. The pegs 19 and 20 are also positioned between the loops 30 and 31 on the ends of the spring 25.

The lower ends of the prongs 12 and 13 are then pressed into the ground to hold the trap 18 at a desired height above the ground. The stake is particularly suitable for setting in water because in many locations the trapper can step on the horizontal portions of the stake that connect the prongs 12 and 13 to the handle 14-16 without having to enter the water. The loop 16 of the handle will generally appear above the water to provide a marker. The stake is usually set in an upright position, but it can be set at an angle to a cliff or bank at the entrance of a den that has a sloping entrance.

I claim:

1. A forked stake for setting rotating-frame animal traps in trails, said traps being the type having a pair of frames with two opposite pivotal points, said stake comprising:

first and second prongs spaced apart approximately the distance between said pivotal points of one said traps with which said stake is to be used, said prongs being substantially parallel while in position to hold said trap, one end of each of said prongs to be pressed into the ground, a pair of pegs protruding from each of said prongs in a lateral direction toward the opposite one of said prongs, said pegs being positined at points spaced from said end of the respective one of said prongs, said pegs of each pair being spaced apart sufficiently to permit one of said pivotal points to fit readily therebetween, each of said pegs being long enough to extend into space between said pair of frames of one of said traps while said frames are in their set position, spring means extending between said prongs, said spring means urging said prongs apart sufficiently to permit each of a said pairs of pegs to be positioned for straddling different one of said pivotal points, retaining means movable to a first position to permit said prongs to be spread apart by said spring means and movable to a second position to bring said prongs toward each other sufficiently to cause said pegs to be inserted between said frames, and said inwardly positioned prongs adapted to position said trap in a trail according to the distance said prongs are pressed into the ground.

2. A forked stake as claimed in claim 1 wherein said spring means has two adjacent portions extending as a common stem from the other ends of said prongs, each of said prongs being connected to a respective one of said adjacent portions to be moved therewith, said adjacent portions tending to separate and diverge for spreading said prongs, said retaining means comprising a ring closely encircling said adjacent portions, said ring being movable along said adjacent portions in a direction away from said prongs to said first position and movable toward said prongs to said second position.

3. A forked stake as claimed in claim 2 wherein said prongs and said spring means are formed from a single length of rod, the central portion of said rod being formed into a loop for a handle, said adjacent portions extending from said loop, the ends of said length of rod forming said prongs, and said rod having spring characteristics for urging said adjacent portions to diverge.

* * * * *